United States Patent [19]
Nakamura et al.

[11] Patent Number: 5,573,983
[45] Date of Patent: Nov. 12, 1996

[54] FINE SILICA TUBE AND PROCESS FOR MAKING SAME

[75] Inventors: Hidenori Nakamura, Kawasaki; Yasushi Matsui, Yokohama; Takao Goto, Ichihara, all of Japan

[73] Assignee: Showa Denko Kabushiki Kaisha, Tokyo, Japan

[21] Appl. No.: 554,715

[22] Filed: Nov. 7, 1995

[30] Foreign Application Priority Data

Nov. 8, 1994 [JP] Japan .................................. 6-298849
Jan. 25, 1995 [JP] Japan .................................. 7-028851

[51] Int. Cl.$^6$ .......................... C03C 13/00; C03C 3/06
[52] U.S. Cl. ..................... 501/12; 501/54; 501/95; 501/133; 501/35; 423/338; 423/339
[58] Field of Search ........................... 423/338, 339; 501/12, 54, 95, 133, 35

[56] References Cited

U.S. PATENT DOCUMENTS 5,011,669  4/1991  Tsuchiya et al. ................... 423/338
5,169,809  12/1992  Brenna et al. ..................... 423/338

OTHER PUBLICATIONS

Sumio Iijima, "Helical Microtuboles of Graphitic Carbon" Nature, Nov. 7, 1991, vol. 354, 56.
Ewan J. M. Hamilton et al, "Preparation of Amorphous Boron Nitride and its Conversion to a Turbostatic Tubular Form" Science, Apr. 30, 1993, vol. 260, 659.
Th. Nemetschek et al, Z. Naturforsch 8b, 410 (1953) no month.
Th. Nemetschek et al, Z. Naturforsch 9b, 166 (1954) no month.

*Primary Examiner*—Karl Group
*Attorney, Agent, or Firm*—Sughrue, Mion, Zinn, Macpeak & Seas

[57] ABSTRACT

A fine silica tube composed of silica gel and having an outer diameter of 0.05 to 2 μm wherein the cylindrical wall portion of the tube has a cross-section defined by a substantially square outer periphery and a substantially square vacant center, or by a circular outer periphery and a substantially square vacant center; and a fine silica tube composed of silica glass and having an outer diameter of 0.05 to 1.4 μm wherein the cylindrical wall portion of the tube has a cross-section defined by a substantially square outer periphery and a substantially square vacant center. The fine silica gel tube is made by treating a tetraalkoxysilane with ammonia or aqueous ammonia in a water-soluble alcohol medium in the presence of tartaric acid, citric acid, a tartaric acid salt or a citric acid salt, whereby the tetraalkoxysilane is hydrolyzed. The fine silica glass tube is made by calcining the fine silica gel tube at 800° to 1,400° C.

28 Claims, 2 Drawing Sheets

FINE SILICA TUBE AND PROCESS FOR MAKING SAME

BACKGROUND OF THE INVENTION (1) Field of the Invention

This invention relates to a fine silica tube composed of silica gel or silica glass, and a process for producing the fine silica tube composed of silica gel or silica glass, by a sol-gel process.

(2) Description of the Related Art

As inorganic fibers, those which are composed of carbon, alumina, zirconia, silica, potassium titanate and glass, are known. As whisker, those which are composed of carbon, alumina, silicon carbide and silicon nitride, are known. As fine tubes, those which are composed of carbon [see S. Iijima, Nature 354, 56 (1991)], boron nitride [see Ewan J. M. Hamilton et al., Science 260, 659 (1993)], and silica glass, are known.

It has been reported that, when powdery quartz and metallic silicon powder are treated at a temperature of 1,200° C. and a reduced pressure of $10^{-3}$ to $10^{-4}$ mmHg, small amounts of fibrous and tubular materials are produced [see Th. Nemetscek and U. Hofmann, Z. Naturforsch 8b, 410 (1953) and Z. Naturforsch 9b, 166 (1954)]. These fibrous and tubular materials are composed of amorphous $SiO_2$ containing metallic silicon.

Where the conventional silica or silica glass fibers are used as a filler or a reinforcer, it is eagerly desired to render them light-weight, enhance the flexural strength or render them hollow-shaped.

For the stable production of the conventional silica glass tube, problems arose in technology and an equipment.

Where the silica or silica glass fibers and tubes are used as a semiconductor material, it is especially required to enhance the purity, reduce the α-rays radiation and reduce the uranium content. However, these requirements are not satisfied. Where the silica or silica glass fibers are used as an implant material, similar requirements must be satisfied.

Further, a fine silica gel tube having a special shape and a high specific surface area is required where the silica gel tube is used for a catalyst carrier and an adsorbent.

SUMMARY OF THE INVENTION

In view of the forgoing, a primary object of the present invention is to provide a fine tube composed of silica gel or silica glass which has a high purity and a reduced radiation dose of α-rays and is useful, for example, as a semiconductor material, an implant material, and a filler or reinforcer to be incorporated in a plastic composite material.

In one aspect of the present invention, there is provided a fine silica tube composed of silica gel.

In another aspect of the present invention, there is provided a fine silica tube composed of silica glass wherein the cylindrical wall portion of the tube has a cross-section defined by a substantially square outer periphery and a substantially square vacant center.

In still another aspect of the present invention, there is provided a process for producing a fine silica tube composed of silica gel, which comprises treating a tetraalkoxysilane with ammonia or aqueous ammonia in a water-soluble alcohol medium in the presence of at least one compound selected from the group consisting of tartaric acid, citric acid, tartaric acid salts and citric acid salts, whereby the tetraalkoxysilane is hydrolyzed.

In a further aspect of the present invention, there is provided a process for producing a fine silca tube composed of silica glass, which comprises the steps of:

treating a tetraalkoxysilane with ammonia or aqueous ammonia in a water-soluble alcohol medium in the presence of at least one compound selected from the group consisting of tartaric acid and tartaric acid salts, whereby the tetraalkoxysilane is hydrolyzed to produce a fine tube composed of silica gel; and then calcining the fine silica gel tube.

DESCRIPTION OF PREFERRED EMBODIMENTS

Figure 1:
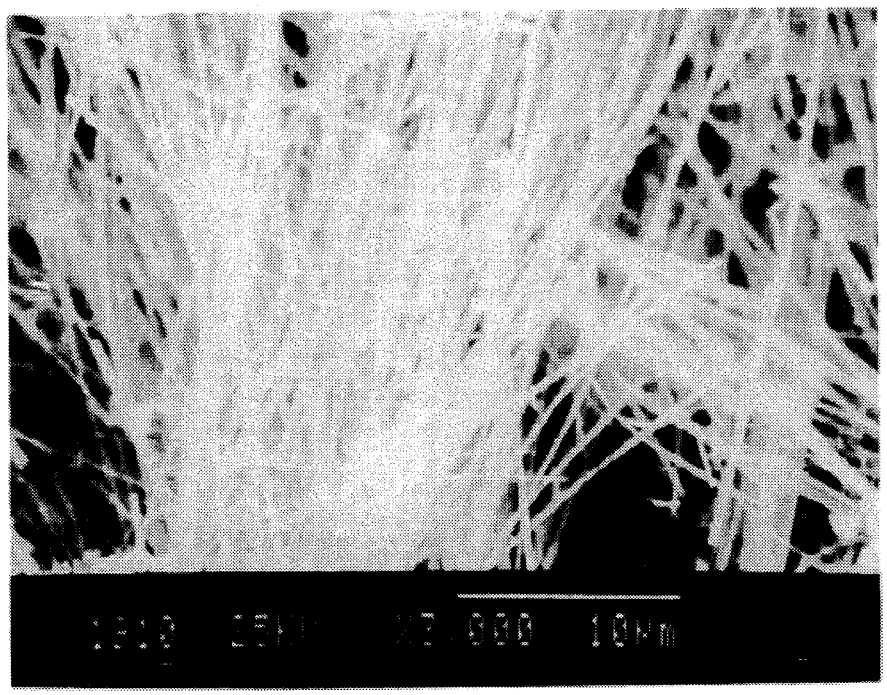
FIG. 1 is an SEM photograph (3,000× magnification) showing an appearance of fine silica gel tubes made in Example 4, hereinafter described.

The fine silica tube of the present invention is composed of either silica gel or silica glass. The fine silica tube composed of silica gel includes two types of tubes, namely, a first type tube such that both ends of the tube are open and the outer and inner tube diameters are substantially uniform over the entire length, and a second type tube such that at least one end of the tube is closed (i.e., one end of the tube is closed and the other end thereof is usually open and on rare occasions closed) and the hollow portion tapers progressively from the open end to the closed end.

The cylindrical wall portion of the fine silica gel tube has a cross-section defined by a substantially square outer periphery and a substantially square vacant center, or by a circular outer periphery and a substantially square vacant center, or by a circular outer periphery and a circular vacant center. The cross-section used herein means that as formed by cutting the tube in the direction perpendicular to the axis of the tube. Usually, the cylindrical wall portion of the first type fine silica gel tube has a cross-section defined by a substantially square outer periphery and a substantially square vacant center, and the cylindrical wall portion of the second type fine silica gel tube has a cross-section defined by a circular outer periphery and a substantially square vacant center.

The dimension of the fine silica tube composed of silica gel is usually such that the outer diameter is in the range of 0.05 to 2 μm, the inner diameter (i.e., hollow diameter) is in the range of 0.02 to 1.5 μm, the length is in the range of 1 to 500 μm, and the radial thickness is in the range of 0.015 μm to about ⅓ of the outer diameter of the tube. More specifically, the first type silica gel tube usually has an outer diameter of 0.05 to 1.5 μm, an inner diameter (i.e., hollow diameter) of 0.02 to 1.0 μm, a length of 1 to 500 μm and a radial thickness of 0.015 μm to about ⅓ of the outer diameter. The second type silica gel tube usually has an outer diameter of 0.3 to 2 µm, an inner diameter (i.e., hollow diameter) of 0.2 to 1.5 µm at the open end, a length of 3 to 20 µm and a radial thickness of 0.015 to 0.3 µm.

The first type tube composed of silica gel usually has a specific surface area of 20 to 30 $m^2/g$, and the outer surface is substantially non-porous. The second type tube composed of silica gel usually has a specific surface area of 200 to 350 $m^2/g$ and the surface is substantially porous. Observation of the outer surface of the second type tube by an SEM reveals that a multiplicity of very fine pores are present in the surface portion thereof. The outer diameter of the second type tube is not uniform and the outer surface is undulant.

The fine silica tube composed of silica gel usually has 4 to 7 silanol (SiOH) groups per 100 angstrom on the surface thereof as measured by an $LiAlH_4$ method described in J. of Colloid and Interface Science, vol. 125, No. 1, 61 (1988).

The fine silica-tube composed of silica glass is made by calcining the fine silica tube composed of silica gel, preferably the first type silica gel tube. When calcined, the fine silica gel tube shrinks. Thus the dimension of the fine silica tube composed of silica glass is about 90 to 95% of the dimension of the fine silica tube composed of silica gel on average. The fine silica glass tube made by calcining the first type silica gel tube usually has an outer diameter of 0.05 to 1.4 µm, an inner diameter (i.e., hollow diameter) of 0.02 to 0.9 µm, a length of 1 to 480 µm and a radial thickness of 0,015 µm to about ⅓ of the outer diameter.

The first type silica gel tube of the present invention is produced by a process wherein a tetraalkoxysilane is treated with ammonia or aqueous ammonia in a water-soluble alcohol medium in the presence of at least one compound selected from tartaric acid and tartaric acid salts, whereby the tetraalkoxysilane is hydrolyzed.

The second type silica gel tube of the present invention is produced by a process similar to that employed for the production of the first type silica gel tube except that the treatment of a tetraalkoxysilane with ammonia or aqueous ammonia is conducted in the presence of at least one compound selected from citric acid and citric acid salts instead of tartaric acid and/or a tartaric acid salt.

The tartaric acid and tartaric acid salts used for the production of the first type silica gel tube have optical isomers including L-, D-, DL- and meso-isomers. Of these, DL- (racemic) tartaric acid and salts thereof, and a mixture of D- and L-tartaric acid or D- and L-tartarate salts, especially a mixture containing 30 to 80% by weight of D-isomer, are preferable. This is because the racemic compound and the D/L mixture result in fine silica gel tubes in a good yield, and, if L-, D- and meso-isomers are used alone, aggregates of spherical and other shapes are produced in a considerable amount. As preferable examples of the tartaric acid salt, there can be mentioned an alkali metal salt such as a sodium salt and an ammonium salt.

The amount of the tartaric acid or tartaric acid salt is preferably in the range of 0.02 to 0.06 mole, more preferably 0.03 to 0.05 mole, per mole of the tetralkoxysilane to be hydrolyzed. If the amount of the tartaric acid or tartaric acid salt is too small, the yield of the fine silica gel tube becomes small. If the amount of the tartaric acid or tartaric acid salt is too large, the fine silica gel tubes tend to be aggregative.

The amount of the citric acid or citric acid salt used for the production of the second type silica gel tube is preferably in the range of 0,015 to 0.05 mole, more preferably 0.03 to 0.05 mole, per mole of the tetralkoxysilane to be hydrolyzed. If the amount of the citric acid or citric acid salt is too small, the shape of the fine silica gel tube tends to become sphere-like. If the amount of the citric acid or citric acid salt is too large, the diameter of the silica gel tube tends to become large and the length thereof tend to be reduced.

The higher the solubility in water of the alcohol, the more preferable the alcohol. Therefore, as preferable examples of the water-soluble alcohol, there can be mentioned ethanol, n-propanol, isopropanol, n-butanol, secbutanol, tert-butanol, 2-petanol, 2,3-dimethyl-2-butanol and tert-amyl alcohol. Of these, ethanol, n-propanol, isopropanol, n-butanol, sec-butanol and tert-butanol are especially preferable. Although methanol has a high solubility in water, it is not preferable because a fine silica tube is rather difficult to produce.

The amount of the water-soluble alcohol is preferably in the range of 55 to 75% by weight based on the weight of the total reaction solution. If the amount of the water-soluble alcohol is outside this range, the yield of the fine silica gel tube becomes too small or the fine silica gel tube tends to be aggregative.

As the tetraalkoxysilane, those which have 1 to 4 carbon atoms in the alkoxy group are preferably used. As examples of the tetraalkoxysilane, there can be mentioned tetramethoxysilane, tetraethoxysilane, tetra-n-propoxysilane, tetraisopropoxysilane, tetra-tert-butoxysilane and tetra-n-butoxysilane. The yield of the fine silica gel tube varies depending upon the particular tetraalkoxysilane, and increases in the order of tetraisopropoxysilane, tetra-n-propoxysilane and tetraethoxysilane. Thus tetraethoxysilane is most preferable.

The amount of the tetraalkoxysilane is preferably 0.3 to 0.8 mole, more preferably 0.4 to 0.6 mole, per liter of the total reaction solution. If the amount of the tetraalkoxysilane is too small, the yield of the fine silica gel tube is too small. If the amount of the tetraalkoxysilane is too large, the reaction solution becomes slurry and the solid concentration in the reaction solution becomes too high, with the result that the reaction does not proceed uniformly and a salient proportion of aggregates are produced.

To attain the hydrolysis reaction at a high efficiency, the reaction solution should contain water in an amount of at least 4 times by mole, preferably 10 to 40 times by mole, of the amount of the tetraalkoxysilane.

Ammonia and/or aqueous ammonia is used as a catalyst for the hydrolysis of a tetraalkoxysilane. The amount of ammonia and/or aqueous ammonia is preferably 2 to 5 moles as $NH_3$ per liter of the total reaction solution. If the amount of ammonia and/or aqueous ammonia is too small, the yield of the fine silica gel tube is minor and the silica gel tube is apt to be aggregative. If the amount of ammonia and/or aqueous ammonia is too large, the rate of reaction becomes rapid and the fine silica gel tubes are apt to be aggregative.

The reaction temperature for hydrolysis is not particularly limited unless the reaction solution is coagulated or partly evaporated whereby the composition becomes nonuniform. Usually the reaction temperature is in the range of 0° to 50° C. The lower the reaction temperature, the smaller the diameter of the silica gel tube produced.

It can be confirmed by the infrared spectroscopic analysis and the X-ray diffraction analysis that the thus-produced fine tube is composed of silica gel. The yield of the fine silica gel tube is high and, especially in the case of the second type silica gel tube, a yield of approximately 100% can be obtained.

The fine silica tube composed of silica glass can be produced by calcining the fine silica gel tube, preferably the first type silica gel tube, at a temperature of about 800° C.

to about 1,400° C. The silica gel tube made by the sol-gel process is characterized in that it can be converted to the silica glass tube at a relatively low temperature. The calcination is usually conducted in an air atmosphere.

The shape of the thus-made fine silica glass tube is similar to that of the fine silica gel tube. But, the fine silica gel tube shrinks to a minor extent during calcination, and therefore, the dimension of the fine silica glass tube is approximately 90 to 95% of the fine silica gel tube.

The invention will now be specifically described by the following examples that illustrate only embodiments of the invention and by no means limit the scope of the invention.

EXAMPLE 1

A two liter-volume beaker was charged with 73 g (0.45 mol per liter of the total reaction solution) of tetraethoxysilane (which had been purified by distillation) and 450 ml (9.79 mol per liter of the total reaction solution) of ethanol, and the content was thoroughly stirred. 2 g (0.038 mol per mol of the tetraethoxysilane) of DL-tartaric acid was dissolved in a mixed solvent composed of 50 ml (1.09 mol per liter of the total reaction solution) of ethanol and 6 ml of distilled water. The thus-obtained DL-tartaric acid solution was added into the beaker, and the mixed solution was stirred at room temperature.

To the mixed solution, 200 ml (3.78 mol as $NH_3$ per liter of the total reaction solution) of 28 wt. % aqueous ammonia was added while being stirred, and, when the addition of aqueous ammonia was completed, the stirring was stopped. At the time of addition of aqueous ammonia, the solution became turbid, but was immediately restored to a transparent state. When the mixed solution was allowed to stand, it again became turbid after the lapse of several minutes, and the reaction was completed within a period of 15 to 20 minutes. The reaction mixture was allowed to stand for 2 hours, and then filtered and thoroughly washed with warm water.

Observation of the product by SEM revealed that it was predominantly comprised of fine tubes and contained a minor proportion of fine spherical particles. The product was placed on a 300 mesh wire gauze and washed with a salient amount of water to remove the fine spherical particles. The yield of the thus-obtained fine tubes was 12 g which was 57% of the tetraethoxysilane used.

X-ray diffraction analysis and infrared spectroscopic analysis of the fine tubes revealed that it was composed of silica gel which was amorphous. The fine silica gel tubes were a mixture comprised of a very large amount of fine silica gel tubes wherein the cylindrical wall portion of each silica gel tube had a cross-section defined by a substantially square outer periphery and a substantially square vacant center, and a very small amount of fine silica gel tubes wherein the cylindrical wall portion of each silica gel tube had a cross-section defined by a circular outer periphery and a circular vacant center. The fine silica gel tubes had an outer diameter of 0.8 to 1.2 μm, an inner diameter of 0.3 to 0.5 μm, and a length of 250 to 350 μm. The outer diameter was substantially uniform over the entire length of the tubes.

The fine silica tubes were calcined at a temperature of 1,000° C. for 1 hour in an air atmosphere. During calcination, the shape did not change but the dimension was reduced to 95% of the original dimension on the average. X-ray diffraction analysis and infrared spectroscopic analysis of the calcined fine silica tubes revealed that they were composed of silica glass.

EXAMPLE 2

A two liter beaker was charged with 200 ml (3.78 mol as $NH_3$ per liter of the total reaction solution) of 28 wt. % aqueous ammonia, and then 2.6 g (0,040 mol per mol of tetraethoxysilane) of diammonium DL-tartarate was added and dissolved. The mixed solution was cooled to 4° C.

In a mixed solvent composed of 500 ml (10.9 mol per liter of the total reaction solution) of ethanol and 6 ml of distilled water, 73 g (0.45 mol per liter of the total reaction solution) of tetraethoxysilane was dissolved, and the obtained solution was cooled to 4° C.

The DL-tartarate-containing mixed solution and the tetraethoxysilane solution were mixed together in a cooling bath maintained at 4° C., and the mixture was allowed to stand for 2 hours.

By the same procedures as described in Example 1, fine silica gel tubes were made. The yield of the fine silica gel tubes was 13.8 g which was 66% of the tetraethoxysilane used. The fine silica gel tubes were a mixture comprised of a very large amount of fine silica gel tubes wherein the cylindrical wall portion of each silica gel tube had a cross-section defined by a substantially square outer periphery and a substantially square vacant center, and a very small amount of fine silica gel tubes wherein the cylindrical wall portion of each silica gel tube had a cross-section defined by a circular outer periphery and a circular vacant center. The fine silica gel tubes had an outer diameter of 0.1 to 0.15 μm, an inner diameter of 0.03 to 0.06 μm, and a length of 100 to 150 μm. The outer diameter was substantially uniform over the entire length of the tubes.

The fine silica gel tubes were calcined in the same manner as described in Example 1. During calcination, the shape did not change but the dimension was reduced to 95% of the original dimension on the average. It was confirmed that the calcined silica tubes were composed of silica glass.

EXAMPLE 3

A two liter beaker was charged with 73 g (0.45 mol per liter of the total reaction solution) of tetraethoxysilane (which had been purified by distillation) and 450 ml (7.51 mol per liter of the total reaction solution) of isopropanol, and the content was thoroughly stirred. A mixture (0.075 mol per mol of the tetraethoxysilane) of 2.25 g of D-tartaric acid and 0.75 g of L-tartaric acid was dissolved in a mixed solvent composed of 50 ml (0.83 mol per liter of the total reaction solution) of isopropanol and 6 ml of distilled water. The thus-obtained tartaric acid solution was added into the beaker, and the mixed solution was stirred at room temperature.

To the mixed solution, 200 ml (3.78 mol as $NH_3$ per liter of the total reaction solution) of 28 wt. % aqueous ammonia was added, and the procedures described in Example 1 were repeated to yield fine silica tubes. The yield of the fine silica tubes was 4.8 g which was 22.9% of the tetraethoxysilane used. The fine silica tubes were composed of a very large amount of fine tubes having a circular cross-section and a very small amount of fine tubes having a substantially square cross-section. The fine silica tubes had an outer diameter of 0.8 to 1.0 μm, an inner diameter of 0.3 to 0.5 μm, and a length of 250 to 350 μm. The outer diameter was substantially uniform over the entire length of the tubes.

The fine silica tubes were calcined in the same manner as described in Example 1. During calcination, the shape did not change but the dimension was reduced to about 93% of the original dimension on the average.

It was confirmed that the uncalcined silica tubes were composed of silica gel, and the calcined silica tubes were composed of silica glass.

EXAMPLE 4

A 200 ml beaker was charged with 9.3 g (0,044 mol per liter of the total reaction solution) of tetrapropoxysilane (which had been purified by distillation) and 45 ml (9.5 mol per liter of the total reaction solution) of ethanol, and the content was thoroughly stirred. 0.25 g (0.047 mol per mol of the tetrapropoxysilane) of DL-tartaric acid was dissolved in a mixed solvent composed of 5 ml (1.06 mol per liter of the total reaction solution) of ethanol and 0.6 ml of distilled water. The thus-obtained DL-tartaric acid solution was added into the beaker, and the mixed solution was stirred at room temperature.

Then the mixed solution was cooled to 10° C. To the mixed solution, 20 ml of 28 wt. % aqueous ammonia was added, and the resultant solution was allowed to stand for 2 hours in a constant temperature bath maintained at 10° C.

The procedures described in Example 1 were repeated to yield fine silica tubes. The yield of the fine silica tubes was 1.1 g which was 52% of the tetrapropoxysilane used. The fine silica tubes were composed of fine tubes having a circulalr cross-section and fine tubes having a substantially square cross-section. The fine silica tubes had an outer diameter of 0.3 to 0.5 μm, an inner diameter of 0.1 to 0.25 μm, and a length of 200 to 300 μm. The outer diameter was substantially uniform over the entire length of the tubes.

The fine silica tubes were calcined in the same manner as described in Example 1. During calcination, the shape did not change but the dimension was reduced to about 95% of the original dimension.

It was confirmed that the uncalcined silica tubes were composed of silica gel, and the calcined silica tubes were composed of silica glass.

Figure 2:
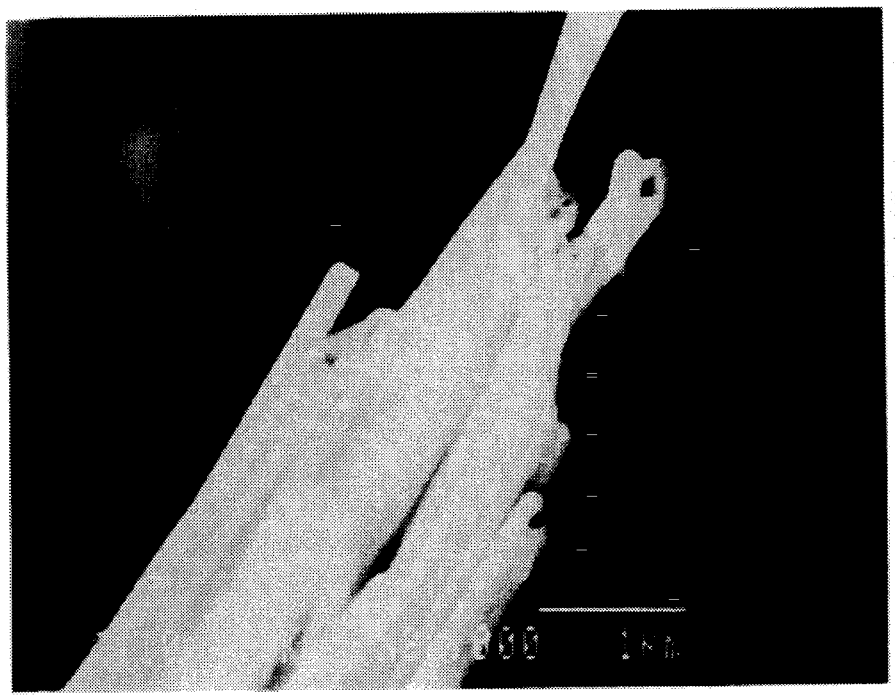
FIG. 2 is an SEM photograph (20,000× magnification) showing an appearance and hollow-shape of fine silica gel tubes made in Example 4.
Figure 3:
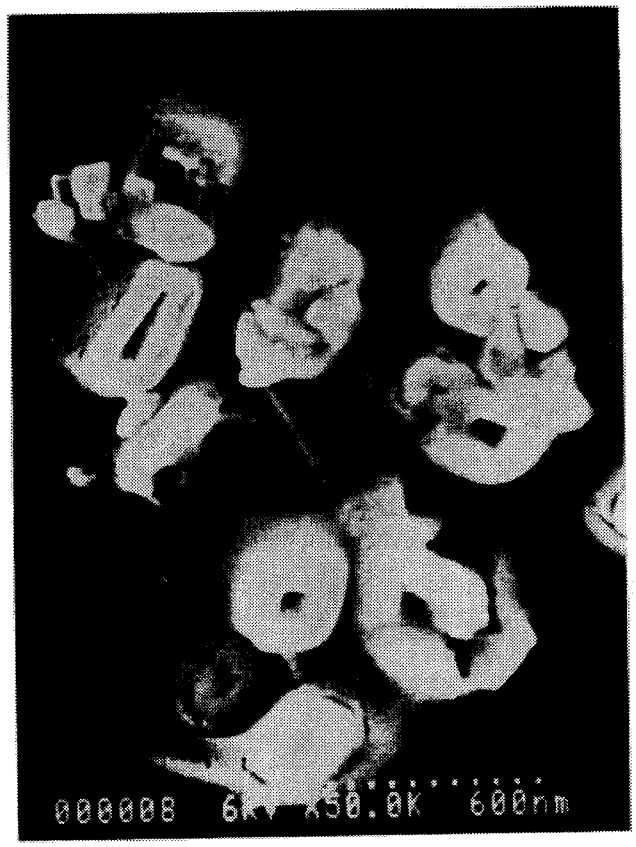
FIG. 3 is an SEM photograph (50,000× magnification) showing a cross-sectional shape of fine silica gel tubes made in Example 4.

An SEM photograph (3,000× magnification) of an appearance of the uncalcined silica tubes and an SEM photograph (20,000× magnification) of an appearance and hollow-shape of the uncalcined silica tubes are shown in FIG. 1 and FIG. 2, respectively. An SEM photograph (50,000× magnification) of a cross-section of the uncalcined silica tubes is shown in FIG. 3.

EXAMPLE 5

A two liter beaker was charged with 73 g (0.45 mol per liter of the total reaction solution) of tetraethoxysilane (which had been purified by distillation) and 450 ml (9.79 mol per liter of the total reaction solution) of ethanol, and the content was thoroughly stirred. 2 g (0.027 mol per mol of the tetraethoxysilane) of citric acid monohydrate was dissolved in a mixed solvent composed of 50 ml (1.09 mol per liter of the total reaction solution) of ethanol and 6 ml of distilled water. The thus-obtained citric acid solution was added into the beaker, and the mixed solution was gently stirred.

To the mixed solution, 200 ml (3.78 mol as $NH_3$ per liter of the total reaction solution) of 28 wt. % aqueous ammonia was added while being stirred, and, when the addition of aqueous ammonia was completed, the stirring was stopped. At the time of addition of aqueous ammonia, the solution became turbid, but was immediately restored to a transparent state. When the mixed solution was allowed to stand, it again became turbid after the lapse of several minutes, and the reaction was completed within a period of 15 to 20 minutes. The reaction mixture was allowed to stand for 2 hours, and then filtered, thoroughly washed with warm water and then dried.

Observation of the product by SEM revealed that the product was composed of fine porous tubes wherein the cylindrical wall portion of each tube had a cross-section defined by a circular outer periphery and a substantially square vacant center; one end of the hollow of each tube was open and the other end of the follow was closed; and the hollow of the tube tapered progressively from the open end to the closed end. The outer diameter was about 1 μm, and the average length was 8.5 μm. X-rays diffraction analysis of the product revealed that the fine tubes were composed of amorphous silica. Observation of the surface of the silica tubes by SEM of a high resolving power revealed that a multiplicity of micropores are found on the surface. The specific surface area was 312 $m^2/g$. The yield of the fine silica tubes was 21 g which was 99% of the tetraethoxysilane used.

EXAMPLE 6

A two liter beaker was charged with a solution of 73 g (0.45 mol per liter of the total reaction solution) of tetraethoxysilane (which had been purified by distillation) in a mixed solvent composed of 500 ml (10.88 mol per liter of the total reaction solution) of ethanol and 6 ml of distilled water. 3 g (0,038 mol per mol of the tetraethoxysilane) of diammonium hydrogencitrate was dissolved in 200 ml (3.78 mol as $NH_3$ per liter of the total reaction solution) of 28 wt. % aqueous ammonia, and the resultant solution was added into the beaker. The thus-obtained mixed solution was stirred at room temperature in the same manner as in Example 5, and then the stirring was stopped. Thereafter, the mixed solution was allowed to stand for 2 hours, and then filtered, thoroughly washed with warm water, and dried in the same manner as in Example 5.

Figure 4:
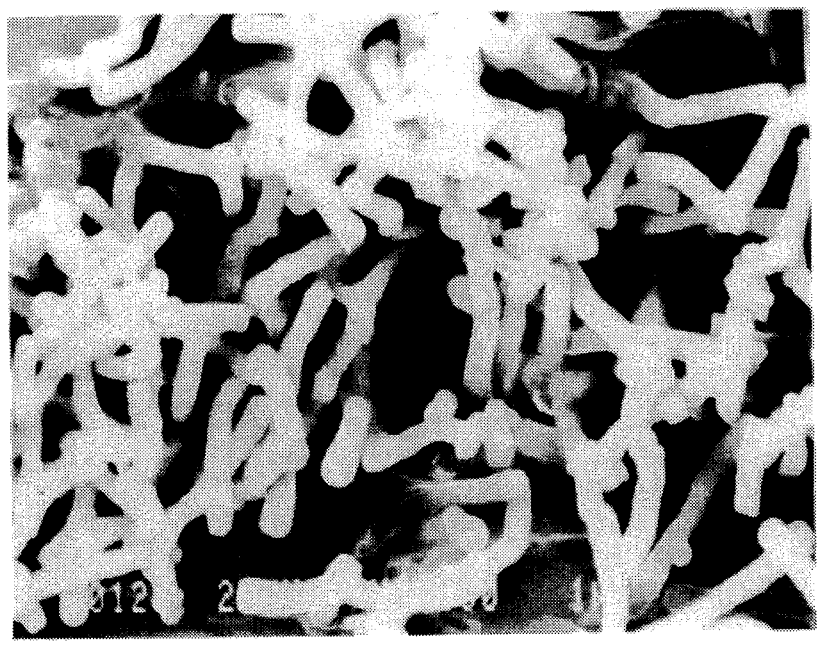
FIG. 4 is an SEM photograph (5,000× magnification) showing an appearance of fine silica gel tubes made in Example 6, hereinafter described.

The product was composed of fine porous silica gel tubes wherein the cylindrical wall portion of each tube had a cross-section defined by a circular outer periphery and a substantially square vacant center; one end of the hollow of each tube was open and the other end of the follow was closed; and the hollow of the tube tapered progressively from the open end to the closed end. The outer diameter was about 0.8 μm, and the average length was 10 μm. The specific surface area was 325 $m^2/g$. The yield of the fine silica gel tubes was 21 g. An SEM photograph (5,000× magnification) of an appearance of the fine silica gel porous tubes is shown in FIG. 4.

EXAMPLE 7

A two liter beaker was charged with a solution of 120 g (0.42 mol per liter of the total reaction solution) of tetrabutoxysilane (which had been purified by distillation) in 500 ml (9.64 mol per liter of the total reaction solution) of ethanol. 4 g (0,051 mol per liter of the total reaction solution) of citric acid monohydrate was dissolved in a mixed solvent composed of 50 ml (0.96 mol per liter of the total reaction solution) of ethanol and 10 ml of distilled water. The thus-obtained solution was added into the beaker, and the mixed solution was gently stirred. Then 200 ml (3.69 mol as $NH_3$ per liter of the total reaction solution) of 28 wt. % aqueous ammonia was added to the mixed solution. The resultant mixed solution was stirred in the same manner as in Example 5, and then the stirring was stopped. Thereafter, the mixed solution was allowed to stand at room temperature for 2 hours, and then filtered, thoroughly washed with warm water, and dried in the same manner as in Example 5.

Thus 22 g (which was 98% of the tetrabutoxysilane used) of fine porous silica tubes were obtained wherein the cylindrical wall portion of each tube had a cross-section defined by a circular outer periphery and a substantially square vacant center; one end of the hollow of each tube was open and the other end of the follow was closed; and the hollow of the tube tapered progressively from the open end to the closed end. The outer diameter was about 1.1 µm, and the average length was 12 µm. The specific surface area was 298 m²/g.

The fine silica tubes of the present invention which is composed of silica gel or silica glass and wherein the cylindrical wall portion of each tube has a cross-section defined by a substantially square outer periphery and a substantially square vacant center or by a circular outer periphery and a substantially square vacant center can be stably obtained. The fine silica tubes have a high purity and a reduced radiation dose of α-rays, and are useful, for example, as a semiconductor material, an implant material, and a filler or reinforcer to be incorporated in a plastic composite material.

What is claimed is:

1. A fine silica tube which composed of silica gel and which has an outer diameter of 0.05 to 2 µm, a length of 1 to 500 µm. and a radial thick thickness of 0.015 µm about ⅓ of the outer diameter of the tube.

2. A fine silica tube according to claim 1 wherein a cylindrical wall portion of the tube has a cross-section defined by a substantially square outer periphery and a substantially square vacant center, or by a circular outer periphery and a substantially square vacant center, or by a circular outer periphery and a circular vacant center.

3. A fine silica tube according to claim 1 wherein both ends of the tube are open and the tube has a substantially uniform outer diameter over the entire length thereof.

4. A fine silica tube according to claim 3 which has an outer diameter of 0.05 to 1.5 µm, an inner diameter of 0.02 to 1.0 µm, a length of 1 to 500 µm, and a radial thickness of 0,015 µm to about ⅓ of the outer diameter.

5. A fine silica tube according to claim 3 wherein a cylindrical wall portion of the tube has a cross-section defined by a substantially square outer periphery and a substantially square vacant center.

6. A fine silica tube according to claim 3 which has a specific surface area of 20 to 30 m²/g.

7. A fine silica tube according to claim 1 wherein at least one end of the tube is closed.

8. A fine silica tube according to claim 1 wherein one end of the tube is closed and the other end is open, and the hollow of the tube tapers progressively from the open end to the closed end.

9. A fine silica tube according to claim 8 which has an outer diameter of 0.3 to 2 µm, an inner diameter of 0.2 to 1.5 µm at the open end, a length of 3 to 20 µm, and a radial thickness of 0.015 to 0.3 µm.

10. A fine silica tube according to claim 8 wherein a cylindrical wall portion of the tube has a cross-section defined by a circular outer periphery and a substantially square vacant center.

11. A fine silica tube according to claim 8 which has a specific surface area of 200 to 350 m²/g.

12. A fine silica tube which is composed of silica glass, which has an outer diameter of 0.05 to 1.4 µm, an inner diameter of 0.02 to 0.9 µm, a length of 1 to 480 µm, and a radial thickness of 0.015 µm to about ⅓ of the outer diameter of the tube and wherein a cylindrical wall portion of the tube has a cross-section defined by a substantially square outer periphery and a substantially square vacant center.

13. A fine silica tube according to claim 12 wherein both ends of the tube are open and the tube has a substantially uniform diameter over the entire length thereof.

14. A process for producing a fine silica tube which is composed of silica gel, and which has an outer diameter of 0.05 to 2 µm, an inner diameter of 0.02 to 1.5 µm, a length of 1 to 500 µm, and a radial thickness of 0,015 µm to about ⅓ of the outer diameter of the tube which comprises treating a tetraalkoxysilane with ammonia or aqueous ammonia in a water-soluble alcohol medium in the presence of at least one compound selected from the group consisting of tartaric acid, citric acid, a tartaric acid salt and a citric acid salt, whereby the tetraalkoxysilane is hydrolyzed.

15. A process for producing a fine silica tube according to claim 14 wherein the tetraalkoxysilane is selected from the group consisting of tetraethoxysilane, tetra-n-propoxysilane, tetraisopropoxysilane, tetramethoxysilane, tetra-tert-butoxysilane and tetrabutoxysilane.

16. A process for producing a fine silica tube according to claim 14, wherein the amount of the tetraalkoxysilane is 0.3 to 0.8 mole per liter of the total reaction solution.

17. A process for producing a fine silica tube according to claim 14, wherein the tartaric acid salts and the citric acid salts are an alkali metal salt or ammonium salt.

18. A process for producing a fine silica tube according to claim 14, wherein the process comprises treating the tetraalkoxysilane with ammonia or aqueous ammonia in the presence of 0.02 to 0.06 mole, per mole of the tetraalkoxysilane, of at least one compound selected from the group consisting of tartaric acid and a tartaric acid salt.

19. A process for producing a fine silica tube according to claim 18, wherein the tartaric acid and the tartaric acid salts are a DL- (racemic) isomer or a mixture of a D-isomer and an L-isomer.

20. A process for producing a fine silica tube according to claim 14, wherein the process comprises treating the tetraalkoxysilane with ammonia or aqueous ammonia in the presence of 0.015 to 0.05 mole, per mole of the tetraalkoxysilane, of at least one compound selected from the group consisting of citric acid and a citric acid salt.

21. A process for producing a fine silica tube according to claim 14, wherein the water-soluble alcohol is selected from the group consisting of ethanol, n-propanol, isopropanol, n-butanol, sec-butanol, tert-butanol, 2-pentanol, 2,3-dimethyl-2-butanol and tert-amyl alcohol.

22. A process for producing a fine silica tube according to claim 14, wherein the amount of the water-soluble alcohol is 55 to 75% by weight based on the weight of the total reaction solution.

23. A process for producing a fine silica tube according to claim 14, wherein the process comprises treating the tetraalkoxysilane with ammonia or aqueous ammonia in the presence of water in an amount of at least 4 times by mole of the amount of the tetraalkoxysilane.

24. A process for producing a fine silica tube according to claim 14, wherein the amount of the ammonia or aqueous ammonia is 2 to 5 moles as $NH_3$ per liter of the total reaction solution.

25. A process for producing a fine silica tube according to claim 14, wherein the process comprising treating the tetraalkoxysilane with ammonia or aqueous ammonia at a temperature of 0° to 50° C.

26. A process for producing a fine silica tube which is composed of silica glass and which has an outer diameter of 0.05 to 1.4 μm, an inner diameter of 0.02 to 0.9 μm, a length of 1 to 480 μm, and a radial thickness of 0.015 μm to about ⅓ of the outer diameter of the tube which comprises the steps of:

treating a tetraalkoxysilane with ammonia or aqueous ammonia in a water-soluble alcohol medium in the presence of at least one compound selected from the group consisting of tartaric acid and a tartazic acid salt, whereby the tetraalkoxysilane is hydrolyzed to produce a free silica tube composed of silica gel; and then calcining the free silica gel tube.

27. A process for producing a fine silica tube composed of silica glass according to claim 26, wherein the process comprises calcining at a temperature of about 800° to about 1,400° C.

28. A process for producing a free silica tube composed of silica glass according to claim 26 wherein the process comprises calcining in an air atmosphere.

* * * * *